Oct. 14, 1969 G. L. HERVERT ET AL 3,472,632
INTERNALLY LINED REACTOR FOR HIGH TEMPERATURES AND
PRESSURES AND LEAKAGE MONITORING MEANS THEREFOR
Filed Nov. 25, 1966

INVENTORS:
Harold C. Weber
George L. Hervert
BY: James R. Hoatson, Jr.
Philip T. Liggett
ATTORNEYS

3,472,632
INTERNALLY LINED REACTOR FOR HIGH TEMPERATURES AND PRESSURES AND LEAKAGE MONITORING MEANS THEREFOR

George L. Hervert, Downers Grove, Ill., and Harold C. Weber, Mason, N.H., assignors to Universal Oil Products Company, Des Plaines, Ill., a corporation of Delaware
Filed Nov. 25, 1966, Ser. No. 596,854
Int. Cl. B01j 3/00
U.S. Cl. 23—290         1 Claim

ABSTRACT OF THE DISCLOSURE

An internally lined reactor comprising an external pressure retaining chamber, an intermediate porous metal layer within the chamber, and a continuous metal liner positioned along the inner wall of the porous layer. A metal casing encompasses and is spaced from the external chamber. Partitions divide the space between chamber and casing into a number of separate compartments encompassing the chamber. A number of spaced apart leakage passageways are extended through and distributed over the surface of the chamber, and at least one monitoring passageway for each compartment is provided through the casing.

---

The present invention is directed to an improved type of reactor construction which utilizes an internal liner of the type adapted to resist penetration and/or corrosion from a particular harmful environment and an intermediate porous metal layer which will transmit internal pressure to an outer chamber wall while, at the same time, perimtting passage of any leakage of harmful reactant materials to the outer pressure chamber where leakage detecting means may be combined therewith as a safety measure. A reactor chamber of this design is of particular advantage in connection with a processing unit handling hydorgen, highly corrosive vapors, or liquid acid catalyst materials, such as fluorine and chlorine containing compounds. The design is also of advantage under high temperature and pressure conditions, such that there may be the avoidance of any serious or damaging consequences under the necessary severe operating conditions. Thus, in addition to providing a novel internally lined reactor construction which utilizes an intermediate layer of a pressure resistant porous metal, there may be the further provision of special small orifice means at spaced points through the outer pressure resisting wall of the reactor such that leakage monitoring means may be located externally thereof.

It is realized that various methods and arrangements have been used to internally line or clad reactor vessels in order to resist corrosive materials or to prevent the passage of hydrogen and thus preclude hydrogen blistering and embrittlement of a carbon steel chamber. In some cases there have been utilized various non-metallic insulation matreials between an internal liner and the outer wall or pressure retaining chamber of the reactor so as to lower the temperature of the wall and prevent hydrogen penetration. However, such designs have problems in accommodating a high pressure within the liner, and there has been required a relatively substantial thickness and high cost, or alternatively, a means to provide a bleed-in pressure behind a thin liner means. In other instances, liners have been used or proposed for the inside of pressure vessels that have a continuous wrap to provide a multiple layer outer wall portion. All constructions, of course, have had a problem in minimizing pin-point leakage that will occur in most stainless steel liners or special metal liners that must be in contact with a severe chemical environment as well as at high temperature and pressure conditions. Further, the differential expansion problems between internal liners of alloy and external pressure chamber constructions of carbon steel frequently result in small cracks and ruptures which enhance the leakage problems.

It may be considered one object of the present invention to use a relatively thick layer of porous metal layer directly under an internal relatively thin alloy layer in a multiple wall reactor construction such that there may be an increased ability to accommodate both pressure and expansion from the internal liner as well as means to effect a transfer of any leakage therefrom to the outer wall of the chamber.

It may be considered a further object of the present invention to make use of small spaced orifices or leakage passageways through spaced portions of the outer pressure chamber wall such that there may be monitoring means communicating with such orifice to determine the extent of leakage in any given zone or area within the reactor chamber.

A still further object of the invention is to embody in combination with a lined reactor construction, the use of an outer casing or thin metal shroud which entirely encompasses the outer reactor wall and have spaced compartments in such casing to confine separately spaced leakage collection zones. Thus, leakage monitoring probs communicating with the various separate surrounding compartments will be continuously available to measure leakage through any particular zone of the lined reactor and in effect provide an advance warning of any serious or dangerous operating conditions.

In a broad aspect the present invention may be considered to provide an improved internally lined reactor construction adapted to accommodate high temperatures and pressures where a corrosive reactant material is involved, in a manner which comprises, having an external pressure retaining reactor chamber with at least one fluid inlet thereto and at least one fluid outlet therefrom, an intermediate porous metal layer within the chamber and positioned directly contiguous the inner wall surface thereof, and a continuous metal liner positioned along the entire inner wall of the porous metal layer and directly adjacent thereto whereby internal reactor pressure will be passed from the liner to the porous metal layer and thence through the latter to the pressure retaining chamber.

In a simplified arrangement there may be small spaced apart leakage passageways through the outer pressure retaining wall and leakage monitoring means connected directly to such small orifices or passageways such that any internal leakage through the special alloy liner means and the adjacent porous metal wall layer will rather quickly be shown up in the monitoring means mounted externally of the reactor chamber.

In a more specific and elaborate embodiment of the present broad invention there may be provided an internally lined reactor for high temperatures and pressures and having leakage monitoring means, which comprises in combination, a high pressure retaining reactor chamber with at least one fluid inlet thereto and at least one fluid outlet therefrom, said chamber further having a plurality of spaced apart small leakage passageways through the wall thereof, an intermediate porous metal layer within said chamber and positioned directly contiguous to the inner wall surface thereof in order to transmit internal pressure to the latter, a continuous metal liner positioned along the entire inner wall of said porous metal layer and directly adjacent thereto whereby internal reactor pressure will be passed from said liner to said porous metal layer and thence through the latter to said pressure retaining chamber, a metal casing encompassing said pressure retaining chamber and spaced a short distance therefrom, spaced partitioning means within said casing and to the exterior wall of said reactor chamber providing a plurality of separate compartments therein to encompass said chamber and monitoring passageway means through said casing to each of said separate compartments whereby any leakage to a compartment will be detected. It is not intended to limit the present improved reactor structure to any one type of processing operation; however, as previously noted, the improved design may be used to particular advantage in connection with high temperature and pressure operations utilizing a penetrating atmosphere such as hydrogen or corrosive materials such as certain acid catalyst materials. Specifically, the lined reactor might well be used in connection with the hydrocracking of heavy oils with highly corrosive gaseous or liquid acid catalysts at high temperatures and pressures in the presence of hydrogen such that the spaced compartments or zones external of the pressure chamber would be monitored for hydrogen penetration or corrosive agents. The various references which have been made to the liner as being of an alloy metal are not intended to be limiting in any aspect. Most frequently, there will be various stainless steel alloy materials used to provide relatively thin internal liners for the various hydrocarbon and chemical processing reactor units; however, liners or claddings may comprise a variety of metals or alloys in order to suitably resist a particular reactor environment and will include metal liners which are primarily of nickel, Inconel, Monel, silver, Hastelloy, platinum, etc. In other words, the term alloy as used herein shall be considered in the generic sense and shall not be limited to any one special metal, alloy, or to stainless steel.

The present improved construction and operation may be better understood by reference to the accompanying drawing and the following description thereof.

FIGURE 1 indicates, in a sectional manner, a portion of multiple layer reactor wall having an intermediate layer of porous metal and an outer pressure retaining wall with spaced small leakage passageway means.

Figure 1:
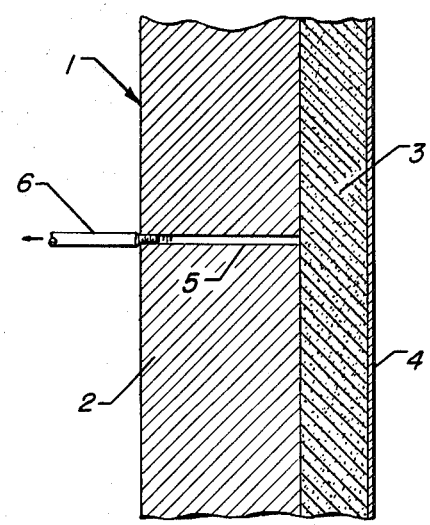

Referring now to the drawing itself, there is indicated a vertically positioned reactor chamber 1 which, as best shown in FIGURE 1, has a multiple layer wall construction with an outer pressure retaining chamber wall 2, an intermediate wall layer 3 and an internal alloy liner 4. The liner, as hereinbefore indicated, may be of a suitable stainless steel or metal other than carbon steel to give the desired resistance for the particular reactor environment at high operating temperatures and pressures. Generally, the liner 4 will be relatively thin but should, of course, have sufficient thickness to preclude easy deformation or indentation. The intermediate layer 3, in accordance with the present invention, will be of a suitable porous metal which will be of a type sufficient to withstand the compressive stresses passed to it from the internal liner 4 from the operating conditions in the latter. At the same time, the porous metal 3 shall have sufficient porosity to be of the type that will gradually permit passage of any leakage through minute cracks or pin-point openings in the liner 4 to the inner surface of the pressure retaining chamber wall 2. In addition, inasmuch as the liner 4 is directly adjacent the intermediate layer and will be subject to some differential expansion and outward radial thrust from internal pressure, it is desirable that the intermediate porous layer be of a deformable nature capable of accommodating a certain amount of expansion from the internal layer.

Also, in accordance with the present invention, the outer pressure retaining chamber wall 2 shall be provided with a plurality of spaced apart small orifices or leakage passageways 5 which are adapted to communicate with surrounding compartment means or with suitable leakage monitoring means having connector means 6. The particular type of leakage monitoring means to be utilized in combination with the present reactor construction does not comprise a part of the present invention and may embody various types of sensing units. For example, various of the chromatograph analyzers may be utilized to provide for the monitoring of a particular gas or a vaporous compound which is being charged to the processing reactor and might leak through the reactor liner wall. In a catalytic process, HBr or $BF_3$ or other compound might be utilized internally in the reactor and the monitoring means made sensitive to fluorine compounds. In another instance, the monitoring means may be sensitive to chlorine materials to test for HCl leakage. In still another instance, as hereinbefore noted in connection with hydrogen treating, the monitoring means may be made sensitive to the presence of hydrogen.

Figure 2:
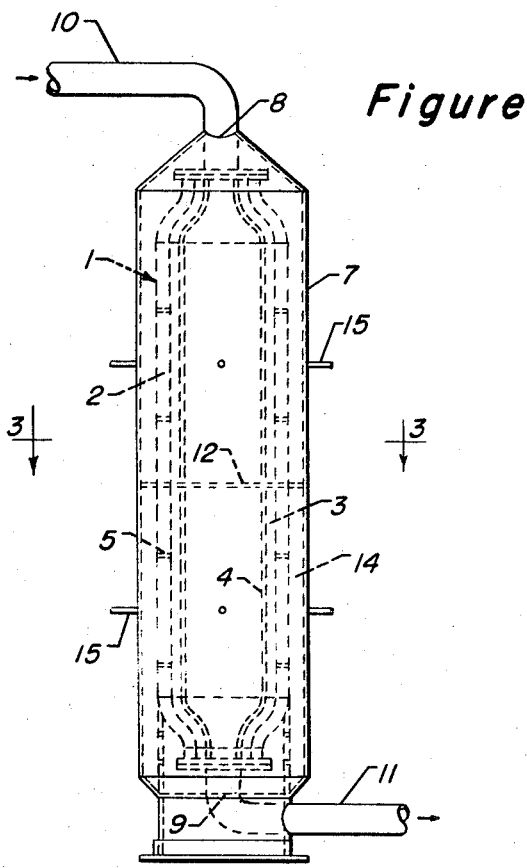
FIGURE 2 shows diagrammatically, in an elevational view, the utilization of a closed metal casing or shroud for encompassing the entire multiple wall reactor chamber and thus providing compartment means to monitor leakage from the reactor.
Figure 3:
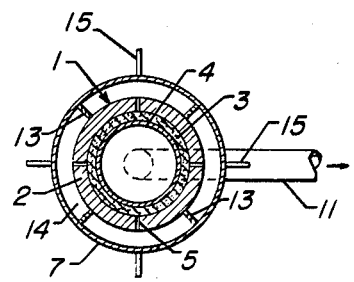
FIGURE 3 is a sectional view, as provided by line 3—3 of FIGURE 2, and shows the compartmentalizing of a closed casing around the multiple layer reactor.

In the diagrammatic embodiment of FIGURES 2 and 3, there is indicated an encompasing casing 7 surrounding the entire reactor chamber 1 with suitable sealing joints made at zones 8 and 9 where the reactor inlet and outlet means 10 and 11 respectively are shown to pass through the casing 7. Also, as shown diagrammatically, there may be suitable horizontal partitioning means, such as 12, and vertical partitioning means such as spaced vertical plates 13. The latter extend between the inside face of the casing 7 and the outside face of reactor wall 2 such that there are resulting spaced vertical compartments 14 within the annular zone. Communicating with each of the spaced compartments 14 are connector probes 15 which are, in turn, adapted to be connected with suitable leakage monitoring means (not shown in the drawing). There of course will be at least one probe or connection 15 for each of the separate spaced compartments or leakage collection zones 14. Thus, the sensing of an increased amount of a particular component being monitored in any one compartment will readily show which area or zone of the reactor is having leakage through the internal liner 4 and thence through the layers 3 and 2 into the particular compartment 14.

The shroud or casing 7 indicated in the present embodiment is merely diagrammatic and may take on any configuration or shape that is desired to suit the particular reactor chamber and, in addition, a greater or lesser number of partitioning means 12 and 13 may be incorporated into the encasement construction so as to in turn provide a greater or lesser number of compartments, such as 14, to provide for the leakage monitoring operation. Still further, it may be noted that other fluid inlet and outlet means may be used in connection with the reactor chamber 1 such that additional seal arrangements may be required between the casing and the fluid inlet or outlet means which must necessarily pass through the casing wall.

We claim as our invention:
1. An internally lined reactor adapted to accommodate high temperatures and pressures with a corrosive reactant material, which comprises in combination:
   (1) an external pressure retaining reactor chamber with at least one fluid inlet thereto and at least one fluid outlet therefrom;
   (2) a porous metal layer positioned within and directly contiguous to the inner wall surface of said chamber in order to transmit internal pressure to said inner wall surface;

(3) a continuous metal liner positioned along the entire inner wall of said porous metal layer and directly adjacent thereto whereby internal reactor pressure will be passed from said liner to said porous metal layer and thence through the porous metal layer to said pressure retaining chamber;
(4) a plurality of spaced apart small leakage passageways through said external pressure retaining chamber, said passageways being distributed over the surface of said chamber;
(5) a metal casing encompassing said pressure retaining chamber and spaced a short distance therefrom;
(6) spaced partitioning means within said casing and to the exterior wall of said reactor chamber providing a plurality of separate compartments which encompass said chamber; and
(7) monitoring passageway means through said casing to provide at least one monitoring passageway for each of said separate compartments whereby any leakage to a compartment may be detected.

References Cited

UNITED STATES PATENTS

| | | | |
|---|---|---|---|
| 2,215,532 | 9/1940 | Richardson | 23—290 X |
| 2,243,240 | 5/1941 | Zerbe | 23—290 X |
| 2,329,970 | 9/1943 | Zimmerman | 23—252 |
| 2,772,860 | 12/1956 | Nelson. | |
| 2,970,042 | 1/1961 | Lagerway | 23—290 |
| 3,140,006 | 7/1964 | Nelson. | |
| 3,231,338 | 1/1966 | Andrus | 23—290 |

FOREIGN PATENTS 1,205,978  2/1960  France.

MORRIS O. WOLK, Primary Examiner

D. G. CONLIN, Assistant Examiner

U.S. Cl. X.R.

23—230, 252, 289; 220—3